United States Patent
Hirzmann et al.

(10) Patent No.: US 11,192,570 B2
(45) Date of Patent: Dec. 7, 2021

(54) APPARATUS AND METHOD FOR HEATING A STEERING WHEEL AND FOR SENSING CONTACT WITH THE STEERING WHEEL

(71) Applicant: TRW Automotive Safety Systems GmbH, Aschaffenburg (DE)

(72) Inventors: Guido Hirzmann, Sailauf (DE); Alexander Lammers, Mühltal (DE); Heinz Lefringhausen, Mainhausen (DE); Volker Stegmann, Aschafffenburg (DE)

(73) Assignee: TRW AUTOMOTIVE SAFETY SYSTEMS GMBH, Aschaffenburg (DE)

(*) Notice: Subject to any disclaimer, the term of this patent is extended or adjusted under 35 U.S.C. 154(b) by 264 days.

(21) Appl. No.: 16/311,730

(22) PCT Filed: Jul. 6, 2017

(86) PCT No.: PCT/EP2017/066935
§ 371 (c)(1),
(2) Date: Dec. 20, 2018

(87) PCT Pub. No.: WO2018/007523
PCT Pub. Date: Jan. 11, 2018

(65) Prior Publication Data
US 2019/0193772 A1    Jun. 27, 2019

(30) Foreign Application Priority Data
Jul. 7, 2016 (DE) .......... 102016008243.7

(51) Int. Cl.
*B62D 1/06* (2006.01)
*B62D 1/04* (2006.01)
*H05B 1/02* (2006.01)

(52) U.S. Cl.
CPC .......... *B62D 1/065* (2013.01); *B62D 1/046* (2013.01); *H05B 1/0236* (2013.01)

(58) Field of Classification Search
CPC .......... H05B 3/0042; H05B 3/34; H05B 3/32; H05B 3/342; H05B 3/345; H05B 3/347;
(Continued)

(56) References Cited

U.S. PATENT DOCUMENTS

| 10,124,823 B2 | 11/2018 | Van tZelfde et al. |
| 2014/0151356 A1* | 6/2014 | Maguire ............... H05B 1/0236 219/204 |

(Continued)

FOREIGN PATENT DOCUMENTS

WO    2016087279    6/2016

*Primary Examiner* — Shawntina T Fuqua
(74) *Attorney, Agent, or Firm* — Tarolli, Sundheim, Covell & Tummino LLP

(57) ABSTRACT

An apparatus for heating a steering wheel and for detecting a steering wheel contact comprises a steering wheel armature (10) made from electrically conductive material and an electric heating conductor (12) arranged outside of the steering wheel armature (10). The apparatus further comprises a control and evaluation device (18) connected to the steering wheel armature (10) and the electric heating conductor (10) by means of which control and evaluation device the electric heating conductor (12) is repeatedly operated temporarily during a heating operation as a heating element for heating the steering wheel and temporarily during a measuring operation as a sensor element for detecting a steering wheel contact. The control and evaluation device (18) is configured so as to maintain the steering wheel armature (10) on a predetermined and especially constant potential at least during each measuring operation.

15 Claims, 1 Drawing Sheet

(58) Field of Classification Search
CPC ........ H05B 3/36; H05B 1/0236; B62D 1/065;
B62D 1/046; B62D 1/04
See application file for complete search history.

(56) References Cited

U.S. PATENT DOCUMENTS

2015/0336601 A1* 11/2015 Van'tZelfde ......... H03K 17/962
219/204
2017/0210409 A1 7/2017 Streifinger et al.

* cited by examiner

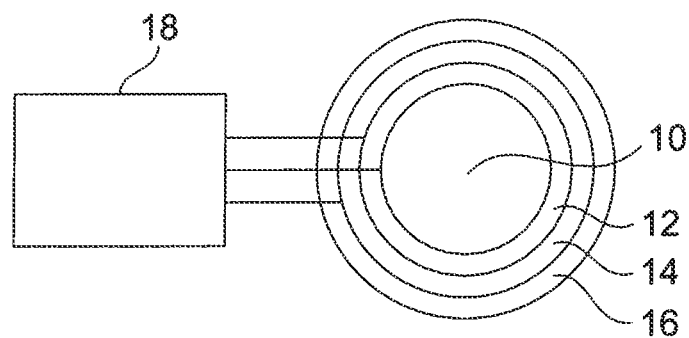

APPARATUS AND METHOD FOR HEATING A STEERING WHEEL AND FOR SENSING CONTACT WITH THE STEERING WHEEL

RELATED APPLICATIONS

This application corresponds to PCT/EP2017/066935, filed Jul. 6, 2017, which claims the benefit of German Application No. 10 2016 008 243.7, filed Jul. 7, 2016, the subject matter of which are incorporated herein by reference in their entirety.

BACKGROUND OF THE INVENTION

The invention relates to an apparatus for heating a steering wheel and for detecting a steering wheel contact. Further, the invention relates to a method for heating a steering wheel and for detecting a steering wheel contact.

Contact identification systems are available comprising sensors that are capable of detecting whether or not the driver's hand or any other body parts are in contact with the steering wheel. Furthermore, there are provided steering wheel rim heating systems which can heat the steering wheel rim as required. A combination of both systems is difficult, however, as they can have a mutual electrical influence.

From US 2015/0336601 a steering wheel is known in which a manual contact sensor system integrated in the steering wheel rim is shielded from the metallic steering wheel armature by applying a voltage to a shielding mat. A steering wheel heating is also integrated in the steering wheel. The structure of the steering wheel rim provides the following sequence of layers (from the inside to the outside): armature-foam-coating-heating mat-shielding mat-sensor mat-wrapping. The sensor mat, the shielding mat and the heating mat include one or more scanning loops or conductor loops which define corresponding scanning zones and, resp., conductor zones. Due to the division of zones, heating can be restricted to those areas of the steering wheel rim in which a hand contact has been established. It is also suggested to use the heating mat at the same time as shielding mat so that a separate shielding mat can be dispensed with. Each of the heating operation and the manual contact detection are alternately carried out in very short time intervals each having a period duration of about 10 to 50 milliseconds. While the heating current of the heating mat may be about 4 to 8 amperes, for shielding a current of less than 200 microamperes is provided. The heating current and the shielding current can be provided by the same power source or by different power sources. Electric lines of the manual contact sensor system located closely to each other are insulated and, in addition, are surrounded by a shield so that the signals transmitted do not mutually interfere with each other.

SUMMARY OF THE INVENTION

It is the object of the invention to provide a most simply designed and thus cost-efficient apparatus by which both a steering wheel can be heated and steering wheel contacts can be reliably detected.

This object is achieved by an apparatus comprising the features of claim 1 as well as by a method comprising the features of claim 8. Advantageous and useful configurations of the apparatus according to the invention and of the method according to the invention are stated in the related subclaims.

The apparatus according to the invention serves both for heating a steering wheel and for detecting a steering wheel contact and comprises a steering wheel armature made from electrically conductive material and an electric heating conductor arranged outside of the steering wheel armature. The apparatus according to the invention further comprises a control and evaluation device connected to the steering wheel armature and to the electric heating conductor by means of which control and evaluation device the electric heating conductor is repeatedly operated temporarily in a heating operation as a heating element for heating the steering wheel and temporarily in a measuring operation as a sensor element for detecting a steering wheel contact. According to the invention, the control and evaluation device is configured so as to maintain the steering wheel armature on a predetermined and especially constant potential at least during each measuring operation.

The invention is based on the finding that an electrically "settled" steering wheel armature does not interfere with the measuring operation for detecting steering wheel contacts. By the fact that the steering wheel armature is maintained on a predetermined potential during the measuring operation intervals, variations of the electrical influence of the steering wheel armature on the measurements are excluded. The influence of the steering wheel armature is constant in time and, accordingly, can be considered ("taken out") as a defined variable during the measurements. A substantial advantage of this measure according to the invention vis-à-vis the solutions known from prior art consists in the fact that it is no longer necessary to shield the electric conductor required for the heating and measuring operations as well as the feed lines thereof from the steering wheel armature.

The steering wheel armature can be maintained on the predetermined potential especially via a RCL element, wherein it is not mandatory for the RCL element to include three components (inductivity, capacitor and resistance).

In order to obtain especially robust measuring results when detecting steering wheel contacts, in an advantageous embodiment an electrically conductive shield connected to the control and evaluation device is arranged outside of the electric heating conductor. The shield according to the invention is no passive shield in the classical sense, however, which is grounded. Rather, the control and evaluation device is arranged so that it applies a voltage varying over time to the shield during each measuring operation. The varying field generated by the actively operated shield is incorporated in the measurements as a defined reference variable and, in this way, ensures better and more reliable results.

For example, according to specifications, the shield can be placed on different previously fixed defined potentials, with the control and evaluation device being appropriately configured. Alternatively, the shield may also actively compensate for specific currently identified influences so as to obtain more distinct signals during the measurements.

Especially preferred are embodiments of the apparatus according to the invention in which, apart from the steering wheel armature and the electric heating conductor and, resp., apart from the steering wheel armature, the electric heating conductor and the possibly present shield, in the steering wheel no further electrically controlled layer is present which is not required for the heating or measuring operation. In these embodiments, there are provided no potential electrical interfering factors that might influence the measuring results and should be additionally taken into account, as far as this is possible at all. On the other hand, thanks to the concept according to the invention, no further electric functional layers are required to provide the desired functionality—alternate heating and measuring by means of the same electric conductor introduced to the steering wheel.

In accordance with a development of the invention, the control and evaluation device is configured so that it adapts the respective time intervals in which the electric heating conductor is operated in the measuring operation and in the heating operation dynamically with consideration of current parameters that are repeatedly supplied to the control and evaluation device. Said parameters reflect current situations such as the currently reached steering wheel temperature or particular traffic situations etc. Under certain circumstances it may be reasonable, for example, to change over more quickly or more slowly between the heating operation and the measuring operation or to lengthen or shorten the intervals of either of the two operating modes relative to those of the other operating mode.

The electric heating conductor may be inserted into the steering wheel in the form of a mat. Alternatively, the heating conductor may as well be introduced to the steering wheel as a single wire by means of a particular working process which itself is not the subject matter of the present invention.

The invention also provides a method for heating a steering wheel and for detecting a steering wheel contact, the steering wheel including a steering wheel armature made from electrically conductive material and an electric heating conductor arranged outside of the steering wheel armature both of which are connected to a control and evaluation device. The method according to the invention comprises the following step of: operating the electric heating conductor alternatingly during a heating operation as a heating element for heating the steering wheel and during a measuring operation as a sensor element for detecting a steering wheel contact, wherein the steering wheel armature is maintained on a predetermined especially constant potential at least during each measuring operation.

Concerning the advantages of the method according to the invention, the respective remarks on the apparatus according to the invention are referred to.

In accordance with the advantageous embodiment described in the foregoing, in the method according to the invention it may be provided that during each measuring operation a voltage varying over time is applied to an electrically conductive shield arranged outside of the electric heating conductor and connected to the control and evaluation device. As afore-mentioned, according to specifications, the shield can be placed on different previously fixed defined potentials or the shield can actively compensate for particular currently identified influences so as to obtain more distinct signals during the measurements.

Equally, by the method of the invention in accordance with the development of the invention the control and evaluation device can adapt each of the time intervals in which the electric heating conductor is operated in the measuring operation and in the heating operation dynamically with consideration of current parameters which are repeatedly supplied to the control and evaluation device.

BRIEF DESCRIPTION OF THE DRAWING

Further features and advantages of the invention are resulting from the following description and from the enclosed drawing which is referred to. In the drawing, the only FIGURE schematically illustrates a cross-sectional view of a steering wheel comprising an apparatus for heating the steering wheel and for detecting a steering wheel contact according to the invention.

DESCRIPTION

The steering wheel rim includes a steering wheel armature 10 made from electrically conductive material in the interior. Outside of the steering wheel armature 10 an electric heating conductor 12 is arranged. The electric heating conductor 12 is inserted in the steering wheel rim e.g. in the form of a mat, but it may as well be introduced to the steering wheel rim as a single wire by means of a special working technique.

Outside of the heating conductor 12 an optional electrically conductive shield 14 is arranged. The outermost layer of the steering wheel rim is a wrapping 16. As a matter of course, the steering wheel rim may comprise further layers. In this case, only the elements 10 and 12 as well as 14, were necessary, are of interest.

The steering wheel armature 10, the heating conductor 12 and, where necessary, the shield 14 are connected to a control and evaluation device 18 which may be designed as a central unit or in the form of plural individual units.

On the one hand, the steering wheel can be heated by the apparatus schematically shown in the FIGURE. On the other hand, the apparatus also serves for detecting a steering wheel contact. Accordingly, the electric heating conductor 12 has a double function as a heating element and as a sensor element. By means of the appropriately designed control and evaluation device 18, the electric heating conductor 12 is repeatedly operated temporarily in a heating operation as a heating element for heating the steering wheel and temporarily in a measuring operation as a sensor element for detecting a steering wheel contact.

It is one peculiarity that the control and evaluation device is configured so as to maintain the steering wheel armature 10 on a predetermined and especially constant potential at least during each measuring operation. The steering wheel armature 10 thus is electrically "settled" so that it does not interfere with the measuring operation for the detection of steering wheel contacts.

For this purpose, during the measuring operation intervals the steering wheel armature 10 is maintained on a predetermined potential, preferably by an RCL element (not shown). In this way, variations of the electrical influence of the steering wheel armature 10 on the measurements are excluded, as it is constant in time and is taken into consideration ("taken out") as a defined variable during measurements.

Due to the optional electrically conductive shield 14, especially robust measuring results can be obtained when detecting the steering wheel contacts. The shield 14 is no passive shield which is grounded only. The control and evaluation device 18 applies a voltage varying over time to the shield 14 during each measuring operation. The varying field generated by the actively operated shield 14 is incorporated in the measurements as a defined reference variable, thus allowing better and more reliable results to be achieved.

On the one hand, according to specifications, the shield 14 can be placed on different previously fixed potentials by the control and evaluation device 18. On the other hand, the shield 14 can as well actively compensate for specific currently identified influences so as to enable more robust signals during the measurements.

Apart from the steering wheel armature 10, the electric heating conductor 12 and, where necessary, the shield 14, the steering wheel rim includes no further electrically controlled layer for the heating or measuring operation.

The control and evaluation device 18 ensures each of the time intervals in which the electric heating conductor 12 is operated in the measuring operation and in the heating operation to be adapted dynamically with consideration of current parameters. The corresponding parameter values such as the currently reached steering wheel temperature or particular traffic situations etc. allow for assessing the current conditions and are repeatedly supplied to the control and evaluation device 18.

The invention claimed is:

1. An apparatus for heating a steering wheel and for detecting a steering wheel contact, comprising:
a steering wheel armature (10) made from electrically conductive material,
an electric heating conductor (12) arranged outside of the steering wheel armature (10),
a control and evaluation device (18) connected to the steering wheel armature (10) and the electric heating conductor (12) by means of which the electric heating conductor (12) is repeatedly operated temporarily during a heating operation as a heating element for heating the steering wheel and temporarily during a measuring operation as a sensor element for detecting a steering wheel contact,
wherein the control and evaluation device (18) is configured so as to maintain the steering wheel armature (10) on a predetermined and especially constant potential at least during each measuring operation, the steering wheel armature (10) being maintained on the predetermined potential via a RCL element.

2. The apparatus according to claim 1, wherein outside of the electric heating conductor (12) an electrically conductive shield (14) connected to the control and evaluation device (18) is arranged and the control and evaluation device (18) is configured so that it applies a voltage varying over time to the shield (14) during each measuring operation.

3. The apparatus according to claim 2, wherein the control and evaluation device (18) is configured so that it places the shield (14) on different defined potentials.

4. The apparatus according to claim 1, wherein apart from the steering wheel armature (10) and the electric heating conductor (12) or, resp., apart from the steering wheel armature (10), the electric heating conductor (12) and the shield (14), no further electrically controlled layer that is not required for the heating or measuring operation is present in the steering wheel.

5. The apparatus according to claim 1, wherein the control and evaluation device (18) is configured so that it adapts each of the time intervals in which the electric heating conductor is operated in the measuring operation and in the heating operation dynamically with consideration of current parameters that are repeatedly supplied to the control and evaluation device (18).

6. The apparatus according to claim 1, wherein the electric heating conductor (12) is inserted in the steering wheel in the form of a mat.

7. A method for heating a steering wheel and for detecting a steering wheel contact, wherein the steering wheel includes a steering wheel armature (10) made from electrically conductive material and an electric heating conductor (12) arranged outside of the steering wheel armature (10) both of which are connected to a control and evaluation device (18), comprising the step of:
operating the electric heating conductor (12) alternately during a heating operation as a heating element for heating the steering wheel and during a measuring operation as a sensor element for detecting a steering wheel contact, the steering wheel armature (10) being maintained on a predetermined and especially constant potential at least during each measuring operation;
the control and evaluation device (18) adapting each of the time intervals in which the electric heating conductor (12) is operated in the measuring operation and in the heating operation dynamically with consideration of current parameters that are repeatedly supplied to the control and evaluation device (18).

8. The method according to claim 7, wherein during each measuring operation a voltage varying over time is applied to an electrically conductive shield (14) arranged outside of the electric heating conductor (12) and connected to the control and evaluation device (18).

9. The method according to claim 8, wherein the shield (14) is placed on different defined potentials.

10. An apparatus for heating a steering wheel and for detecting a steering wheel contact, comprising:
a steering wheel armature (10) made from electrically conductive material,
an electric heating conductor (12) arranged outside of the steering wheel armature (10),
a control and evaluation device (18) connected to the steering wheel armature (10) and the electric heating conductor (12) by means of which the electric heating conductor (12) is repeatedly operated temporarily during a heating operation as a heating element for heating the steering wheel and temporarily during a measuring operation as a sensor element for detecting a steering wheel contact,
the control and evaluation device (18) being configured so as to maintain the steering wheel armature (10) on a predetermined and especially constant potential at least during each measuring operation,
the control and evaluation device (18) being configured so that it adapts each of the time intervals in which the electric heating conductor is operated in the measuring operation and in the heating operation dynamically with consideration of current parameters that are repeatedly supplied to the control and evaluation device (18).

11. The apparatus according to claim 10, wherein the steering wheel armature (10) is maintained on the predetermined potential via a RCL element.

12. The apparatus according to claim 10, wherein outside of the electric heating conductor (12) an electrically conductive shield (14) connected to the control and evaluation device (18) is arranged and the control and evaluation device (18) is configured so that it applies a voltage varying over time to the shield (14) during each measuring operation.

13. The apparatus according to claim 12, wherein the control and evaluation device (18) is configured so that it places the shield (14) on different defined potentials.

14. The apparatus according to claim 10, wherein apart from the steering wheel armature (10) and the electric heating conductor (12) or, resp., apart from the steering wheel armature (10), the electric heating conductor (12) and the shield (14), no further electrically controlled layer that is not required for the heating or measuring operation is present in the steering wheel.

15. The apparatus according to claim 10, wherein the electric heating conductor (12) is inserted in the steering wheel in the form of a mat.

* * * * *